US009305114B2

(12) United States Patent
Yuen et al.

(10) Patent No.: US 9,305,114 B2
(45) Date of Patent: Apr. 5, 2016

(54) BUILDING LONG SEARCH QUERIES

(71) Applicant: Microsoft Corporation, Redmond, WA (US)

(72) Inventors: Aaron Chun Win Yuen, Bellevue, WA (US); Daniel Marantz, Bellevue, WA (US); James Brian Lawson, Kenmore, WA (US); Parthasarathy Govindarajen, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 224 days.

(21) Appl. No.: 13/716,714

(22) Filed: Dec. 17, 2012

(65) Prior Publication Data

US 2014/0172814 A1 Jun. 19, 2014

(51) Int. Cl.
*G06F 17/30* (2006.01)

(52) U.S. Cl.
CPC ........ *G06F 17/3097* (2013.01); *G06F 17/3064* (2013.01); *G06F 17/30864* (2013.01); *G06F 17/30867* (2013.01)

(58) Field of Classification Search
CPC .......................... G06F 17/3097; G06F 17/3064
USPC ....................................................... 707/767
See application file for complete search history.

(56) References Cited

U.S. PATENT DOCUMENTS 8,185,841 B2     5/2012   Rainisto
8,266,528 B1     9/2012   Hayes
8,601,019 B1 *  12/2013   Weininger et al. ............ 707/769
8,639,715 B1 *   1/2014   Brinck et al. ................. 707/767
2006/0248078 A1* 11/2006  Gross et al. ...................... 707/5
2009/0106224 A1  4/2009   Roulland et al.
2012/0047134 A1  2/2012   Hansson et al.
2012/0185498 A1  7/2012   Loofbourrow et al.
2012/0246165 A1* 9/2012   Batraski et al. ............... 707/740

OTHER PUBLICATIONS

"International Search Report & Written Opinion for PCT Patent Application No. PCT/US2013/075587", Mailed Date: Aug. 8, 2014, Filed Date: Dec. 17, 2013, 10 Pages.
"Android Tips and Tricks and Tutorials," Published on Feb. 5, 2010; http://www.techcredo.com/android/android-tips-tricks-and-tutuorials.
Roulland et al., "Query Suggestion for On-Device Troubleshooting," in Proceedings of the 12th IFIP TC 13 International Conference on Human-Computer Interaction: Part II, Aug. 24, 2009; 4 pages.

(Continued)

*Primary Examiner* — Thu-Nguyet Le
(74) *Attorney, Agent, or Firm* — Dave Ream; Jim Ross; Micky Minhas

(57) ABSTRACT

Systems, methods and computer-readable storage media are provided for building long queries utilizing query suggestions and query suggestion entities. Upon receiving at least a portion of a search query, a query suggestion is provided. Upon receiving a selection of the query suggestion, the search query is updated. Prior to executing the updated search query, a user is permitted to edit the updated search query. Query suggestions may be presented in association with query suggestion entity representations. A query suggestion entity is a separate and distinct entity that may initiate performance of an action upon selection. A query suggestion entity representation may comprise various features and information associated with the search query.

20 Claims, 8 Drawing Sheets

(56) References Cited

OTHER PUBLICATIONS

Neil, Teresa, "UI Patterns for Mobile Apps: Search, Sort and Filter," Published on Apr. 10, 2012; http://www.uxdesign.smashingmagazine.com/2012/04/10/ui-patterns-for-mobile-apps-search-sort-filter/.

"Introducing Bing on Windows 8," Retrieved Oct. 8, 2012: http://www.bing.com/community/site_blogs/b/search-archive/2012/08/15/bingonwindows8.aspx.

"Using the onscreen keyboard," Retrieved Oct. 8, 2012: http://www.support.google.com/android/bin/answer.py?hl=en&answer=168449.

International Preliminary Report on Patentability dated Mar. 9, 2015 in Application No. PCT/US2013/075587, 16 pages.

* cited by examiner

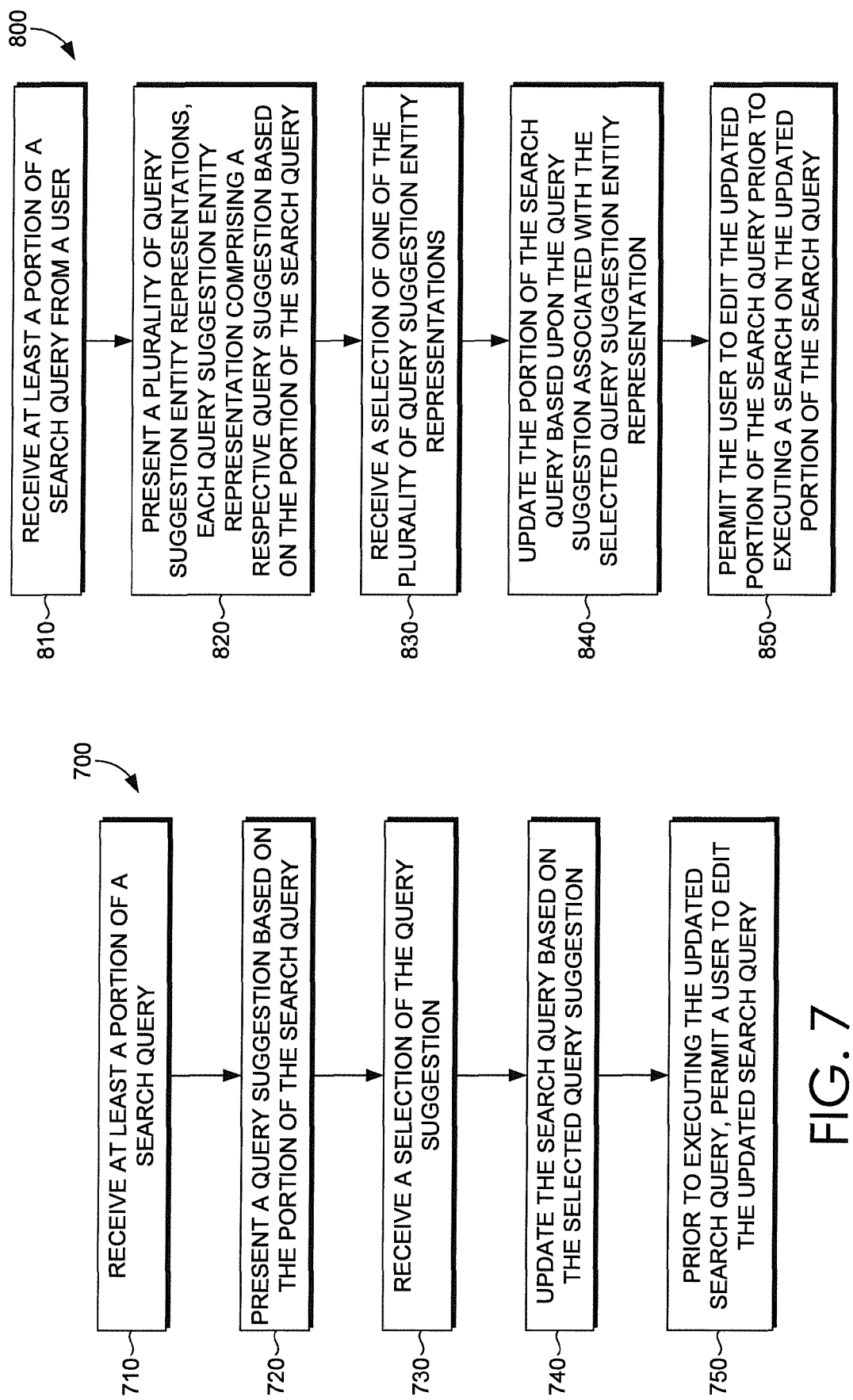

BUILDING LONG SEARCH QUERIES

BACKGROUND OF THE INVENTION

In touch-screen and small-screen environments, it can be difficult for users to input search queries for several reasons, including the lack of a keyboard, the difficulty in using a keyboard on a touch-screen device, or the difficulty in viewing a search query due to an on-screen keyboard occupying a large portion of the screen space. Due to these difficulties, users may desire to utilize options for more quickly and efficiently building search queries, for instance, query suggestion selection. However, the general presentation of query suggestions may also present challenges to a user. In general, query suggestions are presented in a dropdown menu format. In order for a user to view all of a plurality of query suggestions, a user may need to scroll down the list of query suggestions within the dropdown menu which, again, in a small-screen environment, may be problematic.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for, among other things, building long search queries utilizing query suggestions and associated query suggestion entities. Upon receiving at least a portion of a search query, a plurality of query suggestions is presented based upon the search query received. The query suggestions presented are selected to aid the user in quickly building and/or completing lengthy search queries. In embodiments, each query suggestion may comprise a separate query suggestion entity and the query suggestions may be presented via query suggestion entity representations that include the query suggestion and, in some instances, additional data related to the associated query suggestion. Upon selection of a presented query suggestion (e.g., upon selection of a presented query suggestion entity representation), the received portion of the search query is updated. Prior to execution of a search based upon the updated query portion, however, the user is permitted to edit the updated portion of the search query, for instance, by inputting additional textual or alpha-numeric characters, or selecting an additional query suggestion. In embodiments, such functionality is facilitated by automatic placement of the cursor at the end of the updated search query so that the user does not have to take any additional action to continue building a query. Only upon a user affirmatively requesting a search to be conducted through an explicit action, is a search executed on a search query or updated search query. In this way, users are able to quickly and with minimal user interaction with an input mechanism (e.g., a keyboard) build lengthy search queries. Such is particularly useful when utilizing mobile and/or tablet devices having input mechanisms that are more difficult for many users to utilize than standard keyboards.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein:

FIG. 7 is a flow diagram showing an exemplary method for long query building, in accordance with an embodiment of the present invention;

FIG. 8 is a flow diagram showing an exemplary method for generating a query suggestion entity, in accordance with an embodiment of the present invention;

DETAILED DESCRIPTION OF THE INVENTION

Figure 1:
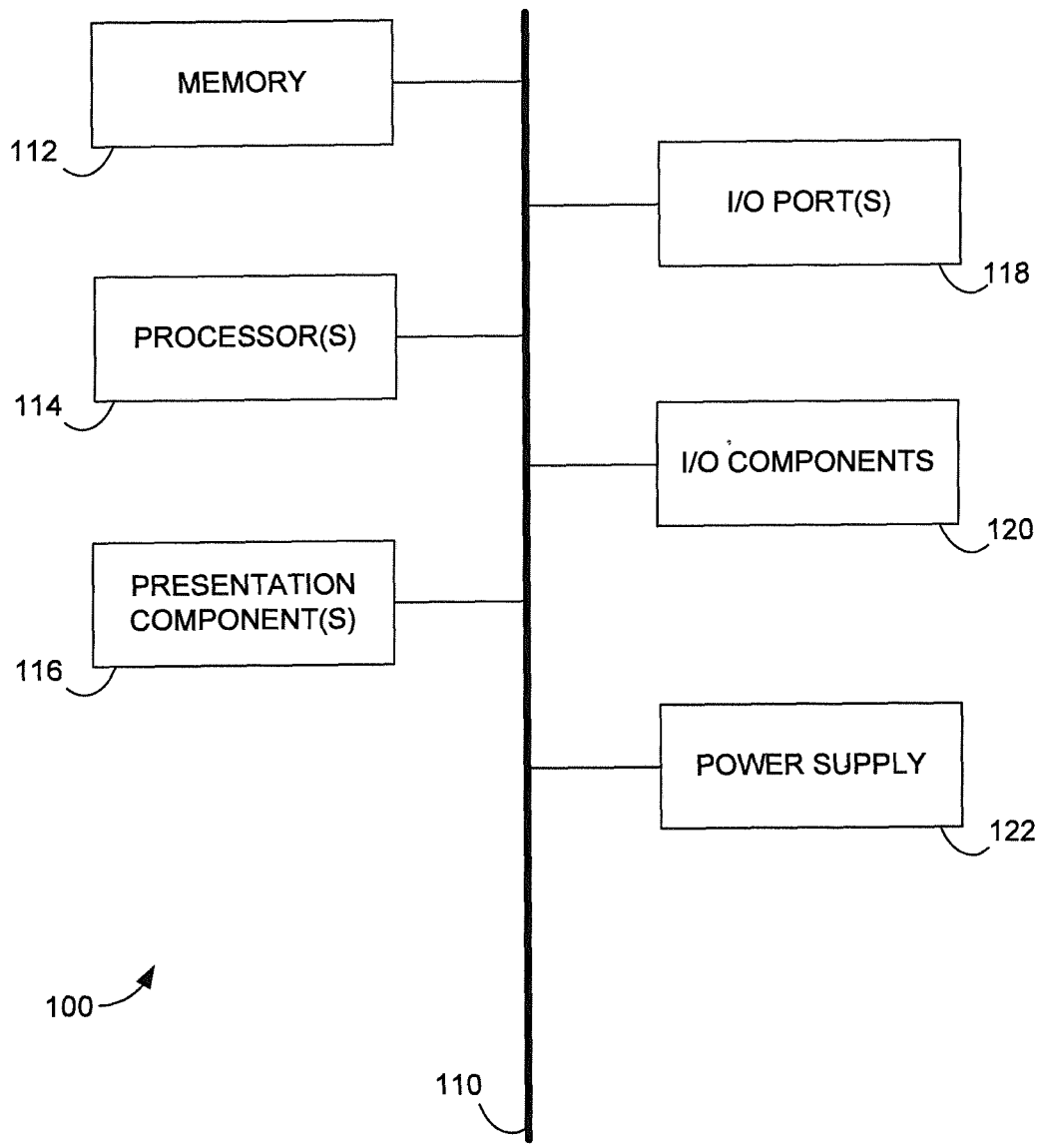
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, building long search queries utilizing query suggestions and associated query suggestion entities. Upon receiving at least a portion of a search query, a plurality of query suggestions is presented based upon the search query received. The query suggestions presented are selected to aid the user in quickly building and/or completing lengthy search queries. In embodiments, each query suggestion may comprise a separate query suggestion entity and the query suggestions may be presented via query suggestion entity representations that include the query suggestion and, in some instances, additional data related to the associated query suggestion.

Upon selection of a presented query suggestion (e.g., upon selection of a presented query suggestion entity representation), the received portion of the search query is updated.

Prior to execution of a search based upon the updated query portion, however, the user is permitted to edit the updated portion of the search query, for instance, by inputting additional textual or alpha-numeric characters, or selecting an additional query suggestion. In embodiments, such functionality is facilitated by automatic placement of the cursor at the end of the updated search query so that the user does not have to take any additional action to continue building a query. Only upon a user affirmatively requesting a search to be conducted, is a search executed on a search query or updated search query. In this way, users are able to quickly and with minimal user interaction with an input mechanism (e.g., a keyboard) build lengthy search queries.

Accordingly, one embodiment of the present invention is directed to one or more computer-readable storage media storing computer-useable instructions that, when used by one or more computing devices, cause the one or more computing devices to perform a method for building long search queries. The method includes receiving at least a portion of a search query from a user and presenting a plurality of query suggestions based on the portion of the search query. The method further includes receiving a selection of one of the plurality of query suggestions and updating the portion of the search query based on the selected query suggestion. Still further, the method includes permitting the user to edit the updated portion of the search query prior to executing a search on the updated portion of the search query.

In another embodiment, the present invention is directed to a method performed by one or more computing devices including at least one processor, the method for building long search queries. The method includes receiving at least a portion of a search query from a user, and presenting a plurality of query suggestion entity representations, each query suggestion entity representation comprising a respective query suggestion based on the portion of the search query. The method further includes receiving a selection of one of the plurality of query suggestion entity representations, updating the portion of the search query based upon the query suggestion associated with the selected query suggestion entity representation and, prior to executing a search on the updated portion of the search query, permitting the user to edit the updated portion of the search query.

In yet another embodiment, the present invention is directed to system for building a long search query. The system comprises a search engine having one or more processors and one or more computer-readable storage media; and a data store coupled with the search engine. The search engine is configured to receive at least a portion of a search query from a user, generate a plurality of query suggestion entity representations, each query suggestion entity representation comprising a respective query suggestion based on the portion of the search query, receive a selection of the plurality of query suggestion entity representations, and update the portion of the search query based on the query suggestion associated with the selected query suggestion entity representation. The search engine is further configured to generate a plurality of updated query suggestion entity representations, each updated query suggestion entity representation comprising a respective updated query suggestion based on the updated portion of the search query. Still further, the search engine is configured to, prior to executing a search on the updated portion of the search query, permit the user to edit the updated portion of the search query.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like. Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "search engine" is used herein, it will be recognized that this term may also encompass a server, a Web browser, a set of one or more processes distributed on one or more computers, one or more stand-alone storage devices, a set of one or more other computing or storage devices, a combination of one or more of the above, and the like.

As previously mentioned, embodiments of the present invention are generally directed to systems, methods, and computer-readable storage media for, among other things, long query building while utilizing query suggestions and query suggestion entities. In embodiments of the present invention, long query building invites a user to input a portion of a search query and select a query suggestion. Upon selection of the query suggestion, the selected query suggestion updates the search query without executing the search query. The updated search query is not executed until an explicit indication is provided by the user that the updated search query should be executed. As used herein, the term "long" of "long query building" is not intended to define or restrict the length of a search query. Long query building can be used to build and edit search queries of any length.

As described above, a query suggestion entity is a separate and distinct entity comprising a query suggestion, which is configured to perform various actions upon certain types of user selections. For example, a query suggestion entity may perform an action of updating a search query upon a user providing a tap and hold gesture type of selection. Additionally, a query suggestion entity may comprise a variety of data and features associated with the query suggestion. For instance, in reference to a search query involving sports, a query suggestion entity may display the current score of a basketball game.

Embodiments of the present invention can be used on various types of computing devices. However, embodiments of the present invention are particularly useful for computing systems in small-screen and touch-screen environments, such as tablets, phones and other mobile devices. An advantage of long query building in small-screen and touch-screen environments is that users do not have to type extensively in order to build a desired search query. Using long query building, a user is able to select a query suggestion and then continue editing the updated search query as the search query does not execute upon selection of a query suggestion. Additionally, using query suggestion entities, a user is able to easily view multiple query suggestions without having to scroll down, for example, a dropdown menu of query suggestions. Further, utilizing query suggestion entities, a user may be able to obtain desired information related to a search query without having to execute the search query.

Figure 2:
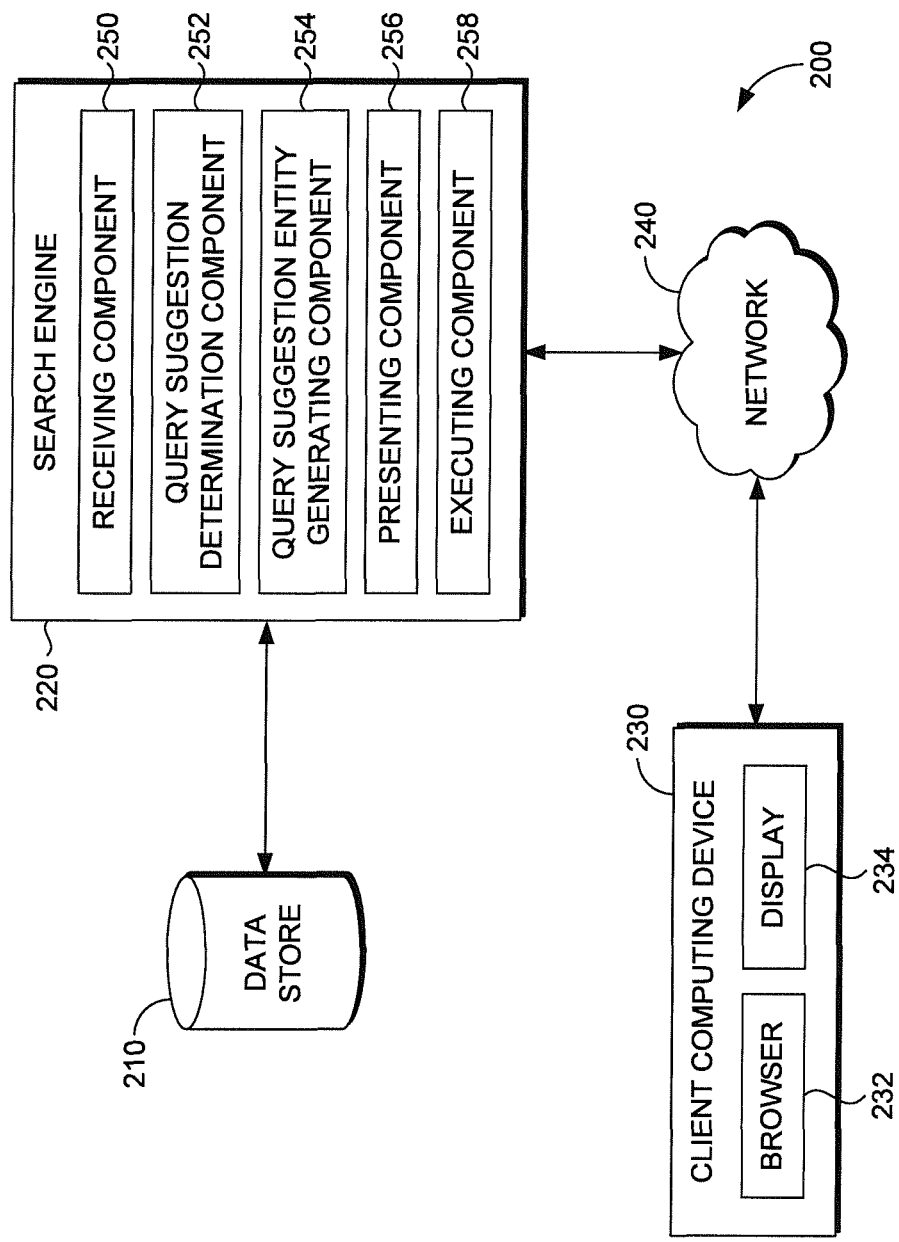
FIG. 2 is a block diagram of an exemplary computing system in which embodiments of the present invention may be employed.

Referring now to FIG. 2, a block diagram is provided illustrating an exemplary computing system 200 in which embodiments of the present invention may be employed. Generally, the computing system 200 illustrates an environment in which a long query may be developed. Among other components not shown, the computing system 200 generally includes a data store 210, search engine 220, and client computing device 230, all in communication with one another via a network 240. The network 240 may include, without limitation, one or more local area networks (LANs) and/or wide area networks (WANs). Such networking environments are commonplace in offices, enterprise-wide computer networks, intranets and the Internet. Accordingly, the network 240 is not further described herein.

It should be understood that any number of search engines 220 or client computing devices 230 may be employed in the computing system 200 within the scope of embodiments of the present invention. Each may comprise a single device/interface or multiple devices/interfaces cooperating in a distributed environment. For instance, the search engine 220 may comprise multiple devices and/or modules arranged in a distributed environment that collectively provide the functionality of the search engine 220 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the user computing device 230, the search engine 220, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines, and/or client computing devices. By way of example only, the search engine 220 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunctions with other components, and in any suitable combination and location. Various functions described herein are being performed by one or more entities may be carried out by hardware, firmware, and/or software. For instance, various functions may be carried out by a processor executing instructions stored in memory.

The client computing device 230 may include any type of computing device, such as the computing device 100 described with reference to FIG. 1, for example. Generally, the client computing device 230 includes a browser 232 and a display 234. The browser 232, among other things, is configured to render search engine home pages (or other online landing pages). The browser 232 is further configured to receive user input of requests for various web pages (including search engine home pages), receive user inputted search queries (generally inputted via a user interface presented on the display 234 and permitting alpha-numeric and/or textual input into a designated search box) and to receive content for presentation on the display 234, for instance, from the search engine 220. It should be noted that the functionality described herein as being performed by the browser 232 may be performed by any other application capable of rendering Web content. Any and all such variations, and any combination thereof, are contemplated to be within the scope of embodiments of the present invention.

The search engine 220 of FIG. 2 is configured to receive search queries, determine search query suggestions for presentation and user selection, update query selections and, upon explicit action on the part of the user, execute search queries. As illustrated, the search engine 220 includes a receiving component 250, a query suggestion determining component 252, query suggestion entity generating component 254, a presenting component 256 and an executing component 258. The illustrated search engine 220 also has access to a data store 210. The data store 210 is configured to store information pertaining to search queries, search results, and query suggestions. In various embodiments, such information may include, without limitation, query logs and search results. In embodiments, the data store 210 in configured to be searchable for one or more items stored in association therewith. It will be understood and appreciated by those of ordinary skill in the art that the information stored in association with the data store 210 may be configurable and may include any information relevant to search queries, query suggestions, and/or search results. The content and volume of such information are not intended to limit to the scope of embodiments of the present invention in any way. Further, though illustrated as a single, independent, component, the data store 210 may, in fact, be a plurality of storage devices, for instance, a database cluster, portions of which may reside in association with the search engine 220, the client computing device 230, another external computing device (not shown), and/or any combination thereof.

The receiving component 250 of the search engine 220 is configured to receive requests for presentation of search results (e.g., algorithmically-identified search results) that satisfy an input search query. Typically, such a request is received via a browser associated with a user computing device, for instance, the browser 232 associated with the user computing device 230. It should be noted, however, that embodiments of the present invention are not limited to users inputting a search query into a traditional query-input region of a screen display.

In accordance with embodiments of the present invention, the receiving component 250 is configured to receive at least a portion of a search query (i.e., a request for presentation of search results) from a user. (The receiving component 250 is further configured to receive a selection of the query suggestion and update a received query portion, as more fully described below.) As the portion of the search query is received, the query suggestion determining component 252 is configured to determine a plurality of query suggestions based on the input search query portion, for instance, utilizing information obtained from data store 210. Query suggestions are suggestions configured to aid a user in completing or adding onto a search query or search query portion and are based upon, for instance, past queries received from the user, past queries received from a corpus of a plurality of users, known word and/or topic matching alpha-numeric or textual sequences, and the like. Any and all such variations, and any combination thereof, are contemplated to be within the scope of embodiments of the present invention.

The query suggestion entity generating component 254 is configured to generate a query suggestion entity that is separate and distinct from other query suggestions or query suggestion entities and includes, at least, an associated query suggestion. Query suggestion entities additionally may include a variety of data and features associated with a query suggestion. In embodiments, query suggestion entities are packaged for presentation as query suggestion entity representations. A query suggestion entity representation is configured to permit various actions to be performed upon receipt of various types of user selection actions with respect thereto.

In embodiments, query suggestion entity representations may be of a variety of shapes, such as a square, a rectangle or a circle. In embodiments, a query suggestion entity representation may comprise a bounded region that is distinct with respect to other query suggestion entity representations, each itself represented by a bounded region. A plurality of query suggestion entity representations may be presented in various formats, including a list of any length or a grid of any size. Any and all such variations, and any combination thereof, are contemplated to be within the scope of embodiments of the present invention. As each query suggestion entity representation is indicative of a separate entity, not all query suggestion entity representations need be the same size and or shape.

Various formats for presentation of query suggestion entity representations may provide advantages to a user based on the type of device a user is utilizing in accessing the query suggestion entity representations. Specifically, the grid format comprising a plurality of query suggestion entity representations may be particularly advantageous to a user on a mobile device with a small, touch-screen. Providing a group of query suggestion entity representations in a grid format allows multiple query suggestions to be viewed without scrolling down as query suggestion entity representations may be placed side-by-side. In embodiments of the present invention, a user is able to view multiple query suggestions within query suggestion entity representations while building a long query.

In certain embodiments, a query suggestion entity representation may comprise one or more distinguishing visual features such as colors, font types, graphics and patterns. In embodiments, the distinguishing visual features indicate certain aspects related to the query suggestion, such as a trending search query, a search query previously executed by a particular user, an indication of the type of search results associated with the query suggestion, and/or a query category. For example, a query suggestion entity representation may include a background color of blue and/or an arrow icon within the bounded region thereof indicating that the query suggestion is a trending search query. In another example, a query suggestion entity representation may include a video icon within the bounded region thereof. The video icon may indicate that the query suggestion within the query suggestion entity representation is associated with a set of video-heavy search results.

With continued reference to FIG. 2, the presenting component 256 is configured to transmit determined query suggestions and/or corresponding query suggestion entity representations including the query suggestions for presentation, for instance, in association with the client computing device 330, where the display 334 may present the query suggestion entity representations to the user.

As previously stated, the receiving component 250 is further configured to receive a selection of the query suggestion and update a received query portion in response thereto. The query suggestion determining component 252 is further configured to determine an updated query suggestion based on the updated search query and information obtained from data store 210. The query suggestion entity generating component 254 is further configured to generate a query suggestion entity (and corresponding query suggestion entity representation) that comprises at least a portion of the updated query suggestion. And, the presenting component 256 is further configured to transmit the updated query suggestion and the query suggestion entity comprising the updated query suggestion to, for instance, the client computing device 330, where the display 334 may present the updated query suggestion and updated query suggestion entity representation to the user.

Upon receiving explicit instruction from the user (e.g., via selection of the enter button, a search initiation icon, or the like), the executing component 258 of the search engine 220 is configured to execute the updated search query only upon receiving input to execute the updated search query.

Figure 3:
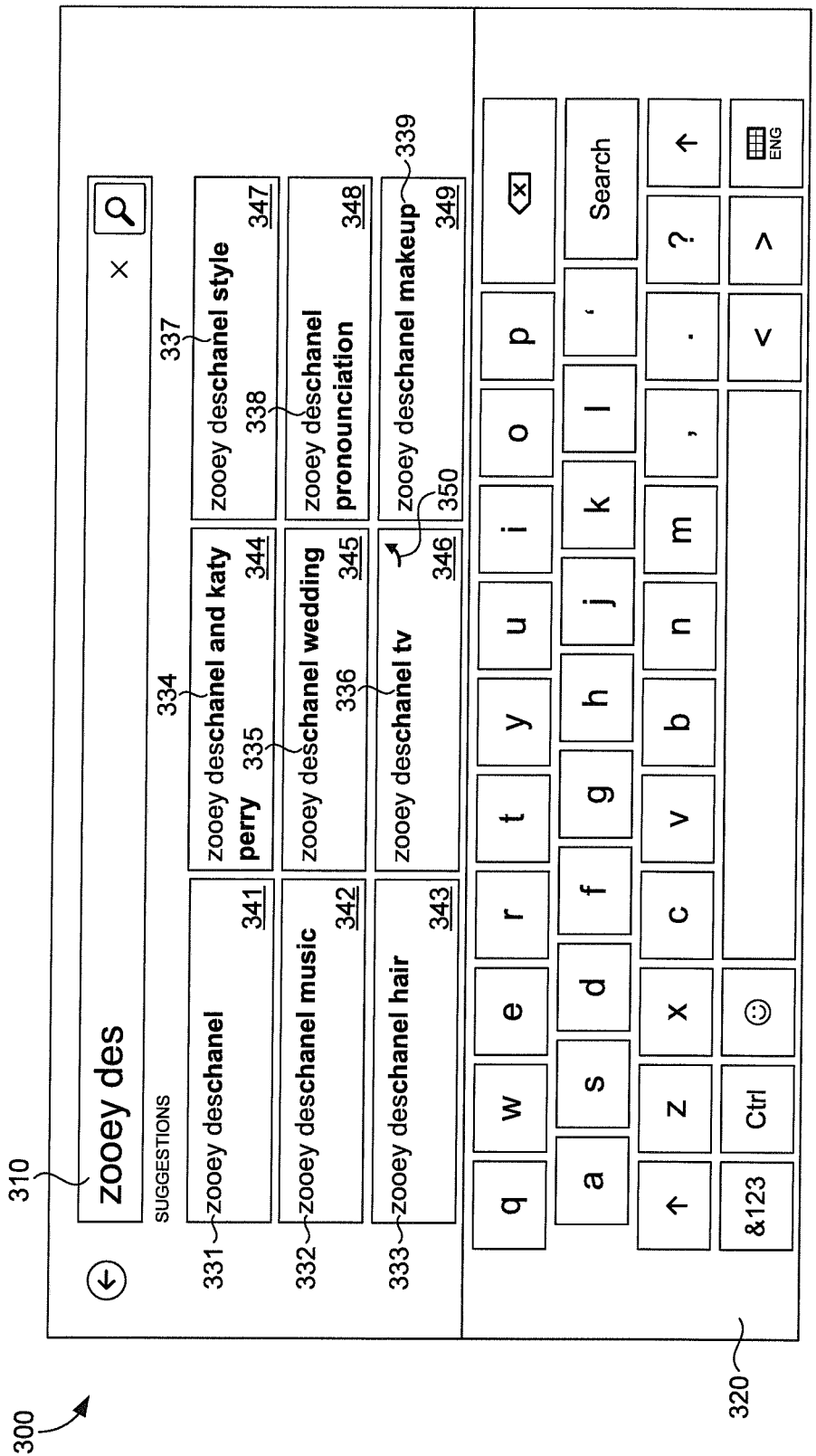
FIG. 3 is a schematic diagram showing an exemplary screen display showing presentation of query suggestion entity representations, in accordance with an embodiment of the present invention.

Turning now to FIG. 3, a schematic diagram illustrating an exemplary screen display showing aspects of the present invention is provided and designated generally as reference numeral 300. The screen display 300 includes a portion of a search query 310 ("zooey des"), a touch-screen keyboard 320, a plurality of query suggestions 331, 332, 333, 334, 335, 336, 337, 328, and 339, and a plurality of query suggestion entity representations 341, 342, 343, 344, 345, 346, 347, 348, 349, respectively representing the associated query suggestions. One of the query suggestion entity representations 346 includes a distinguishing visual feature 350. As shown in FIG. 3, as a user inputs a search query portion 310 of "zooey des," query suggestions 331, 332, 333, 334, 335, 336, 337, 338 and 339 are generated based on the search query portion input and query suggestion entity representations 341, 342, 343, 344, 345, 346, 347, 348, and 349 are generated including the query suggestions, respectively. In FIG. 3, the query suggestion representations 341, 342, 343, 344, 345, 346, 347, 348, and 349 are formatted in a grid format. The grid format of the query suggestion entity representations allows a user to view multiple query suggestions without scrolling down and while still viewing the touch-screen keyboard 320. The query suggestion query suggestion entity representations 341, 342, 343, 344, 345, 346, 347, 348, and 349 include the visual attribute of bold type font. The bold type font, in this exemplary embodiment, indicates a portion of the query suggestion that is not provided in the original search query. Query suggestion entity representation 346 includes a distinguishing visual feature of an arrow 350. The arrow may be associated with variety of aspects related to the query suggestion 336 of "zooey deschanel tv show." For instance, the arrow may indicate that the query suggestion 336 of "zooey deschanel tv show" is a trending search query or has been previously executed by the user.

In certain embodiments, a query suggestion entity representation permits the performance of various actions upon certain types of user selections. The actions a query suggestion entity may perform, include, without limitation, updating a search query based on the query suggestion, providing a second query suggestion related to the query suggestion, providing additional data associated with the search query, providing synonyms of the search query, and changing a first query suggestion to a second query suggestion. The additional data associated with the search query may include a preview of the search results. For instance, a preview of the search results may include a subset of search results representative of the full set of search results. A preview may be included within the bounded region of the query suggestion entity representation or displayed in a separate window upon a certain type of user selection of the query suggestion entity representation.

In certain embodiments, a query suggestion entity may be configured to initiate performance of an action based on a certain type of user selection. The user selection may include, but is not limited to, a right mouse click, a left mouse click, a drag down gesture, a slide-across gesture, a slide-down gesture, and a tap and hold gesture. For example, a query suggestion entity representation may initiate the action of updating a search query based on the query suggestion upon a tap and hold gesture type of selection. In another example, a query suggestion entity may initiate the action of providing additional data associated with the search query upon a slide-across gesture type of selection. In embodiments, a query suggestion entity may be configured to perform only one action or more than one action. Any and all such variations, and any combination thereof, are contemplated to be within the scope of embodiments hereof.

Figure 4:
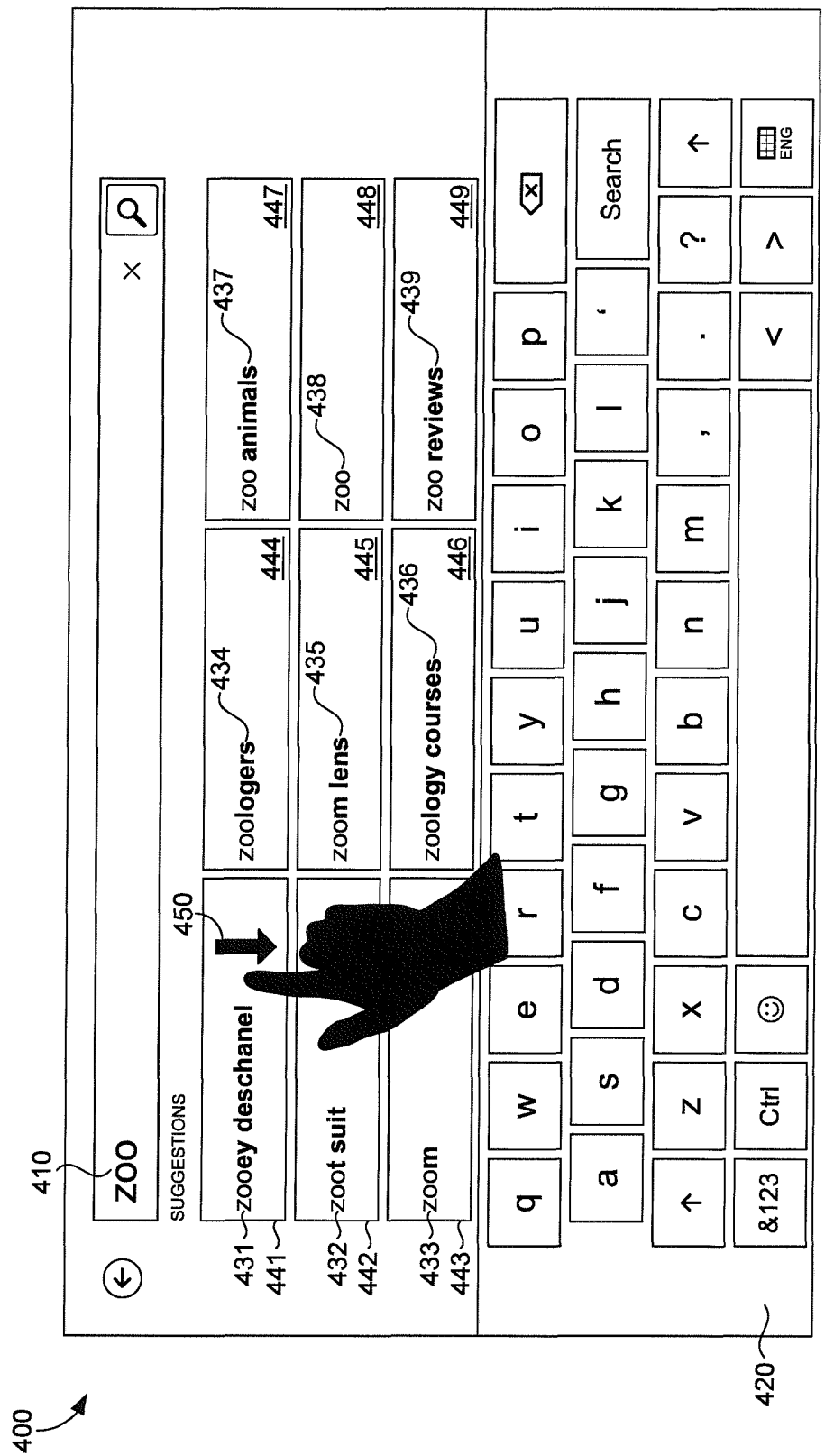
FIG. 4 is a schematic diagram showing an exemplary screen display having query suggestion entities, in accordance with an embodiment of the present invention.

Turning now to FIG. 4, an exemplary embodiment of the present invention in shown comprising a display 400 of a device, a search query portion 410, a touch-screen keyboard 420, query suggestions 431, 432, 433, 434, 435, 436, 437, 438, and 439, query suggestion entity representations 441, 442, 443, 444, 445, 446, 447, 448, and 449, and a slide-down gesture type of user selection 450. In FIG. 4, a user is shown making a selection of query suggestion 431 of "zooey deschanel" by selecting query suggestion entity representation 441 using a slide-down gesture type of selection 450. Upon the selection of the query suggestion entity representation 441, the search query portion 410 is updated based on the query suggestion 431. As can be shown in FIG. 5, an updated search query 510 is presented comprising query suggestion 431 "zooey deschanel."

Figure 5:
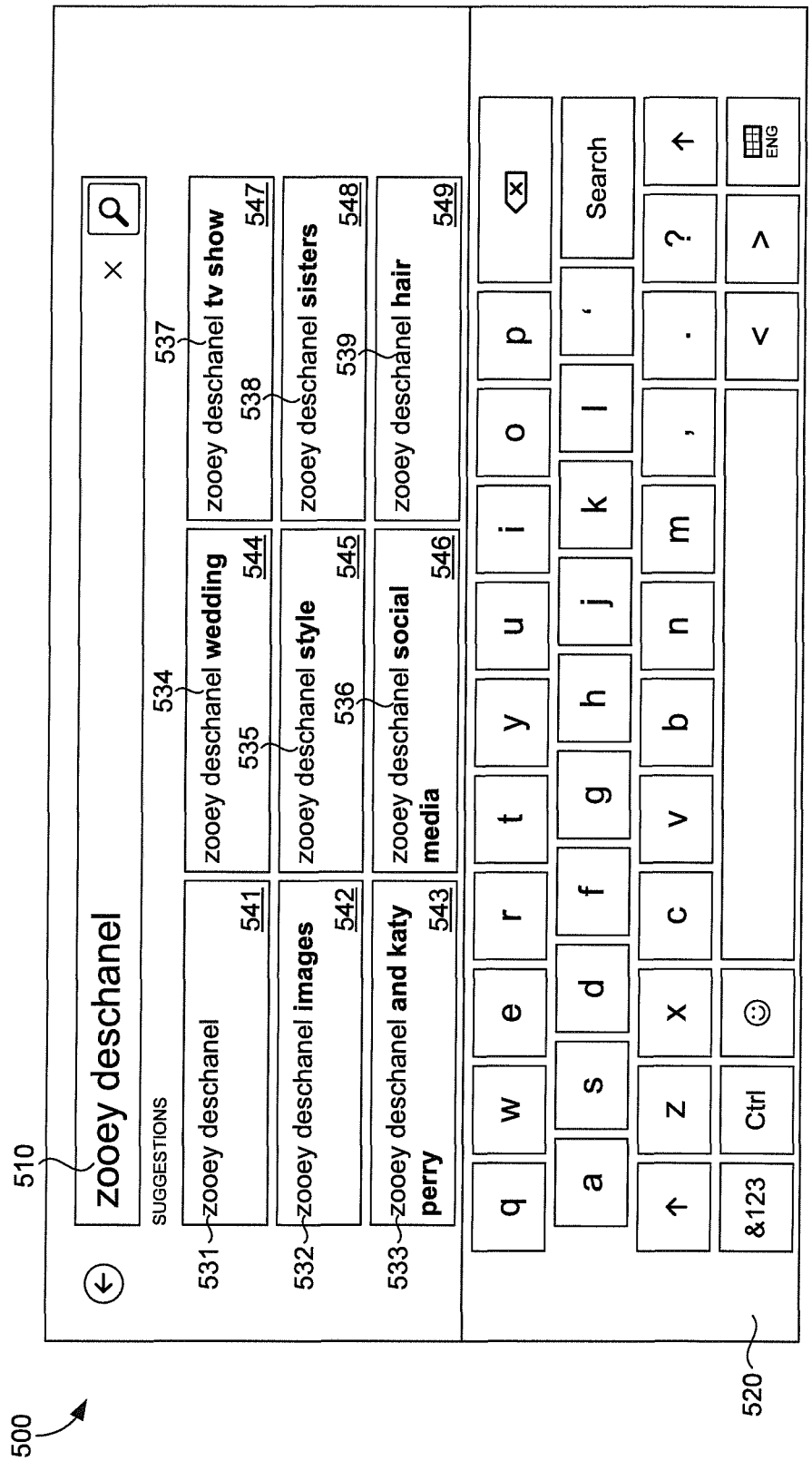
FIG. 5 is a schematic diagram showing an exemplary screen display having query suggestion entities, in accordance with an embodiment of the present invention.

Also shown in FIG. 5, once the search query portion is updated and displayed as an updated search query portion 510, a plurality of updated query suggestion entity representations 541, 542, 543, 544, 545, 546, 547, 548 and 549 is presented including updated query suggestions 531, 532, 533, 534, 535, 536, 537, 538, and 539, respectively. At this stage, as the user has not explicitly taken action to initiate a search, no search has been initiated.

Figure 6:
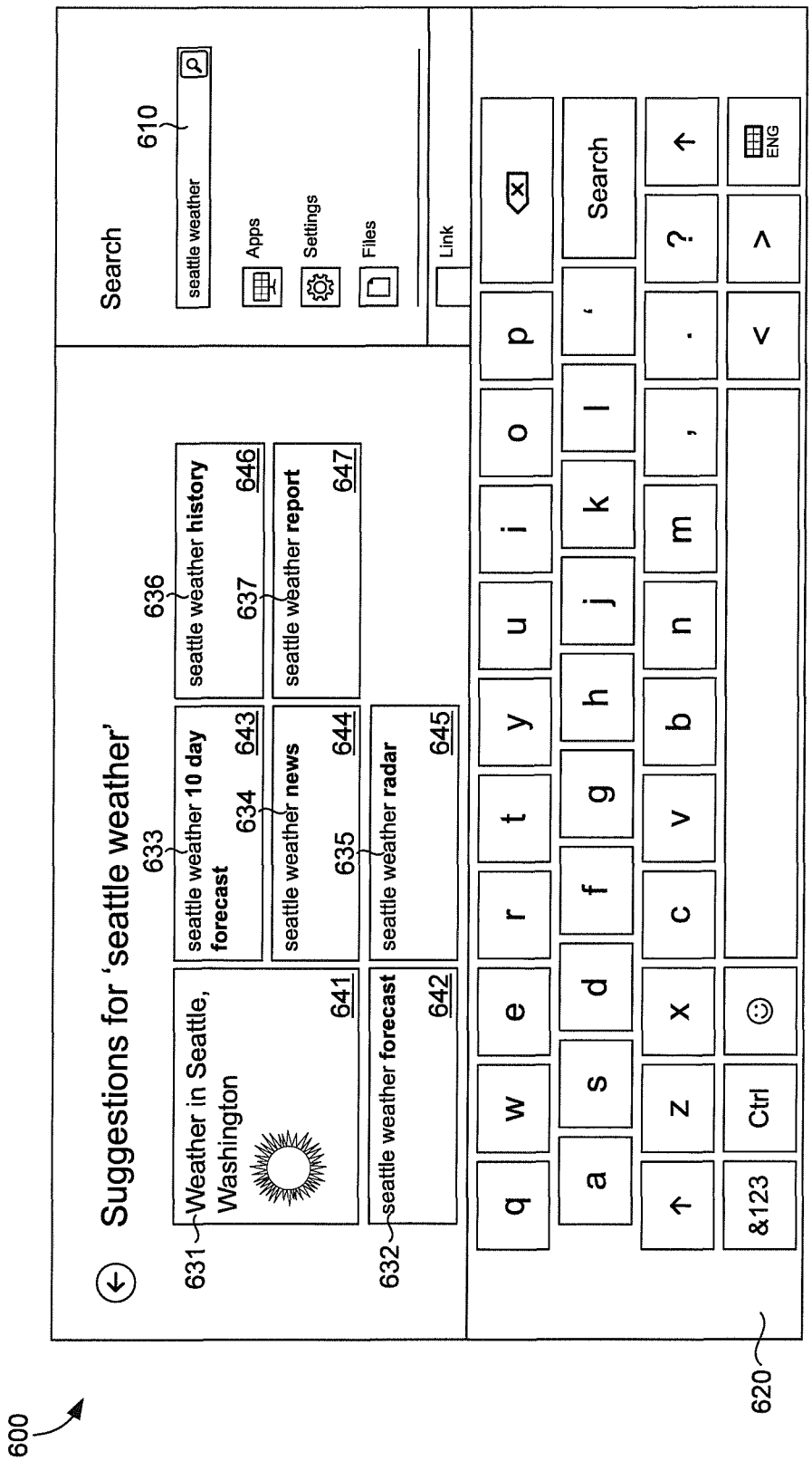
FIG. 6 is a schematic diagram showing an exemplary screen display having query suggestion entities, in accordance with an embodiment of the present invention.

In certain embodiments, additional data associated with a query suggestion and/or search query portion is included in a query suggestion entity and the corresponding query suggestion entity representation. The additional data may include, but is not limited to, images, detailed information related to the corresponding search query suggestion and/or one or more search results of the query suggestion and/or search query portion. FIG. 6 is an exemplary embodiment of the present invention showing a screen display 600 of a device, a search query portion 610, a keyboard 620, query suggestions 631, 632, 633, 634, 635, 636, and 637 and corresponding query suggestion entity representations 641, 642, 643, 644, 645, 646, and 647. The search query portion 610 indicates a user may be searching for "seattle weather." Query suggestion entity representation 641 provides detailed information related to the search query by providing an image of a sun, indicating the current weather condition in Seattle.

Turning now to FIG. 7, a flow diagram is illustrated showing an exemplary method 700 for building a search long query, in accordance with an embodiment of the present invention. As shown at block 710, at least a portion of a search query is received, for instance, by the receiving component 250 of the search engine 220 of FIG. 2. As shown at block 720, a query suggestion based on the portion of the search query is presented, for instance, by presenting component 256 of the search engine 220 of FIG. 2. At block 730 a selection of the query suggestion is received, for instance, by receiving component 250 of search engine 220 of FIG. 2. At block 740, the original search query is updated based on the selected query suggestion, for instance, by receiving component 250 of search engine 220 of FIG. 2. As shown at block 750 the user is permitted to edit the updated search query, prior to executing the updated search query. The updated search query may be executed, for instance, by executing component 258 of search engine 220 of FIG. 2, only upon explicit user indication that query execution is desired.

Turning now to FIG. 8, a flow diagram is illustrated showing another exemplary method for building a long search query, in accordance with an embodiment of the present invention. As indicated at block 810, at least a portion of a search query is received, for instance, by the receiving component 250 of the search engine 220 of FIG. 2. As shown at block 820, a plurality of query suggestion entity representations is presented, each query suggestion entity representation comprising a respective query suggestion based on the portion of the search query. Such presentation may be performed, for instance, by the presenting component 256 of the search engine 220 of FIG. 2. As shown at block 830, a selection of one of the plurality of query suggestion entity representations is received, for instance, by the receiving component 250 of the search engine 220 of FIG. 2. As shown at block 840, the portion of the search query is updated based upon the query suggestion associated with the selected query suggestion entity representation, for instance, utilizing the receiving component 250 of the search engine 220 of FIG. 2. As indicated at block 850, the user is permitted to edit the updated search query, prior to executing the updated search query. The updated search query may be executed, for instance, by executing component 258 of search engine 220 of FIG. 2, only upon explicit user indication that query execution is desired.

Figure 9:
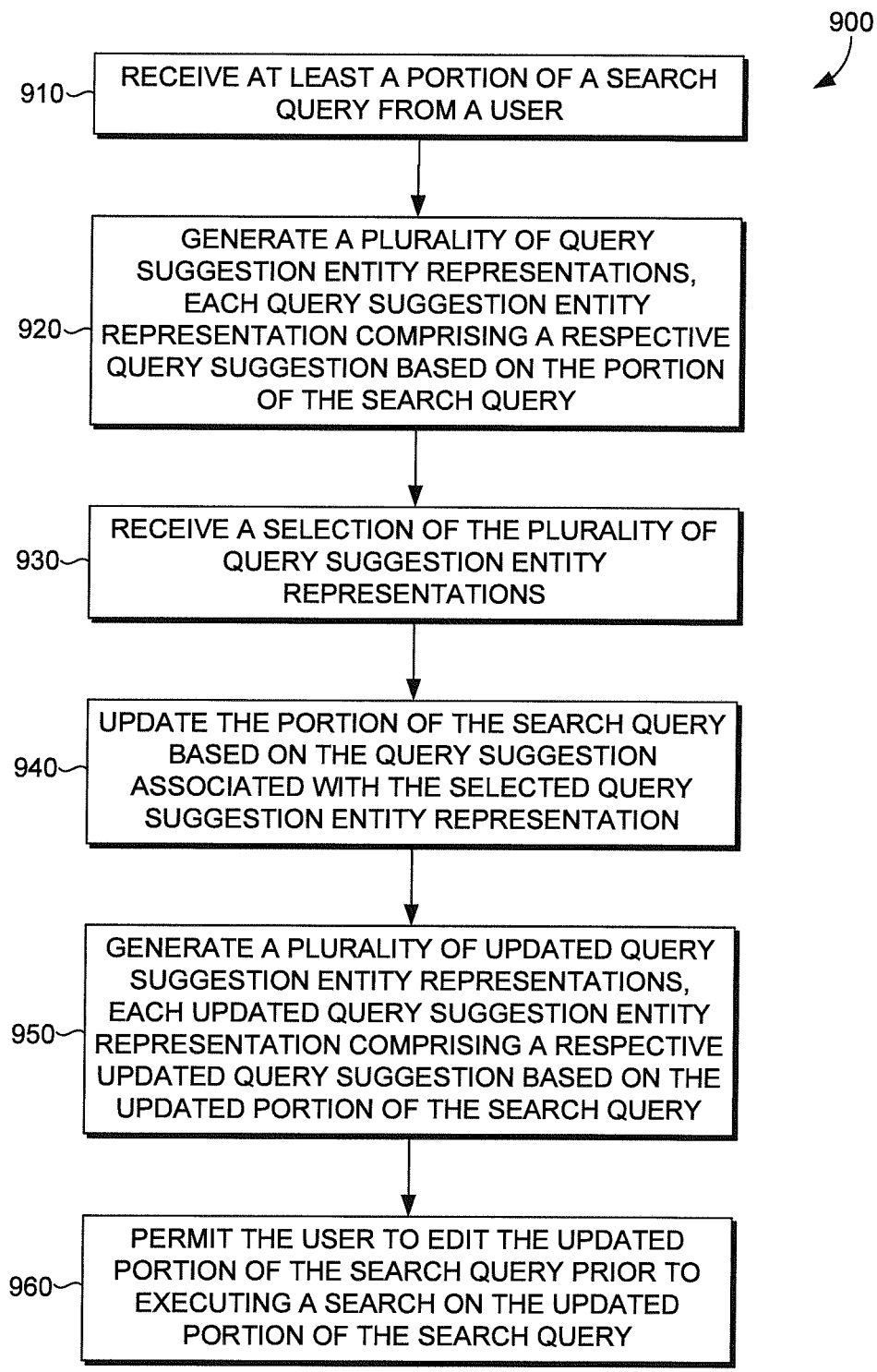
FIG. 9 is a flow diagram showing an exemplary method for long query building utilizing a generated query suggestion entity, in accordance with an embodiment of the present invention.

Turning now to FIG. 9, a flow diagram is illustrated showing an exemplary method for long query building utilizing generated query suggestion entities, in accordance with embodiments of the present invention. As shown at block 910, at least a portion of a search query is received, for instance, by receiving component 250 of the search engine 220 of FIG. 2. As indicated at block 920, a plurality of query suggestion entity representations is generated, each query suggestion entity representation comprising a respective query suggestion based on the portion of the search query. Such query suggestion entity representation generation may be done, for instance, utilizing the query suggestion entity generating component 254 in conjunction with the query suggestion determining component 254 of the search engine 220 of FIG. 2. As indicated at block 930, a selection of one of the plurality of query suggestion entity representations is received, for instance, by the receiving component 250 of the search engine 220 of FIG. 2. The portion of the search query is then updated based on the query suggestion associated with the selected search query suggestion entity representation, as indicated at block 940. This may be done, for instance, utilizing the receiving component 250 of the search engine 220 of FIG. 2. A plurality of updated query suggestion entity representations is generated, as indicated at block 950, each updated query suggestion entity representation comprising a respective updated query suggestion based on the updated portion of the search query. This may be done, for instance, utilizing the query suggestion entity generating component 254 in conjunction with the query suggestion determining component 252 of the search engine 220 of FIG. 2. As indicated at block 960, the user is permitted to edit the updated search query, prior to executing the updated search query. The updated search query may be executed, for instance, by executing component 258 of search engine 220 of FIG. 2, only upon explicit user indication that query execution is desired.

As can be seen, various aspects of the technology described herein are generally directed to systems, methods, and computer-readable storage media for, among other things, building long search queries utilizing query suggestions and associated query suggestion entities. Upon receiving at least a portion of a search query, a plurality of query suggestions is presented based upon the search query received. The query suggestions presented are selected to aid the user in quickly building and/or completing lengthy search queries. In embodiments, each query suggestion may be comprise a separate query suggestion entity and the query suggestions may be presented via query suggestion entity representations that include the query suggestion and, in some instances, additional data related to the associated query suggestion.

Upon selection of a presented query suggestion (e.g., upon selection of a presented query suggestion entity representation), the received portion of the search query is updated. Prior to execution of a search based upon the updated query portion, however, the user is permitted to edit the updated portion of the search query, for instance, by inputting additional textual or alpha-numeric characters, or selecting an additional query suggestion. In embodiments, such functionality is facilitated by automatic placement of the cursor at the end of the updated search query so that the user does not have to take any additional action to continue building a query. Only upon a user affirmatively requesting a search to be conducted, is a search executed on a search query or updated search query. In this way, users are able to quickly and with minimal user interaction with an input mechanism (e.g., a keyboard) build lengthy search queries.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 700 of FIG. 7, 800 of FIG. 8, and 900 of FIG. 9 is not meant to limit the scope of the present invention in any way and, in fact, the steps may occur in a variety of different sequences within embodiments hereof. Any and all such variations, and any combination thereof, are contemplated to be within the scope of embodiments of the present invention.

Having thus described the invention, what is claimed is:

1. One or more computer-readable storage media having computer executable instruction embodied thereon that, when executed, perform a computer-implemented method for building long search queries, the method comprising:
    receiving at least a portion of a search query from a user;
    generating a plurality of query suggestions based on the portion of the search query;
    generating a plurality of query suggestion entity representations, each of the query suggestion entity representations corresponding to at least one query suggestion of the plurality of query suggestions, wherein each of the query suggestion entity representations comprises a query suggestion and data and features associated with the query suggestion;
    presenting the plurality of query suggestion entity representations to the user, wherein each of the plurality of query suggestion entity representations is configured to initiate performance of a plurality of actions, each action of the plurality of actions having a corresponding gesture selection type of a plurality of gesture selection types;
    receiving a user selection of one of the plurality of query suggestion entity representations via a gesture selection type of the plurality of gesture selection types;
    executing an action corresponding to the received gesture selection type;
    updating the portion of the search query based on the user selection; and
    prior to executing a search on the updated portion of the search query, permitting the user to edit the updated portion of the search query.

2. The computer-readable storage media of claim 1, wherein the method further comprises presenting a plurality of updated query suggestion entity representations based upon the updated portion of the search query.

3. The computer-readable storage media of claim 1, wherein,
    plurality of gesture selection types comprise: a right mouse click, a left mouse click, a drag down gesture, a slide-across gesture, slide-down gesture, a tap and hold gesture, and any combination thereof, and
    wherein the plurality of actions comprise: updating a search query based on the query suggestion, providing a second query suggestion related to the query suggestion, providing additional data associated with the search query, providing synonyms of the search query, and changing a first query suggestion to a second query suggestion.

4. The computer-readable storage media of claim 1, wherein each of at least a portion of the plurality of query suggestion entity representations comprises a bounded region that is distinct with respect to others of the plurality of query suggestion entity representations.

5. The computer-readable storage media of claim 4, wherein presenting the plurality of query suggestion entity representations comprises presenting a first of query suggestion entity representation of the plurality of query suggestion entity representations with a bounded region having at least one of a size and a shape that is different from at least one of a size and a shape of a bounded region of a second query suggestion entity representation of the plurality of query suggestions entity representations.

6. The computer-readable storage media of claim 1, wherein the method further comprises presenting at least one of the plurality of query suggestion entity representations with one or more distinguishing visual features.

7. The computer-readable storage media of claim 6, wherein the distinguishing visual feature is indicative of one or more of: a trending search query, a previous search query executed by the user, and a query category.

8. The computer-readable storage media of claim 1, wherein the selection is received as one of: a tap and hold gesture, a slide-down gesture, a slide-across gesture, a right mouse click, a left mouse click, a drag-down gesture, and any combination thereof.

9. A method being performed by one or more computing devices including at least one processor, the method for building long search queries, the method comprising:
    receiving at least a portion of a search query from a user;
    presenting a plurality of query suggestion entity representations, each query suggestion entity representation comprising a respective query suggestion based on the portion of the search query, wherein each of the plurality of query suggestion entity representations is configured to initiate performance of a plurality of actions, each action of the plurality of actions having a corresponding gesture selection type of a plurality of gesture selection types;
    receiving a selection of one of the plurality of query suggestion entity representations via a gesture selection type of the plurality of gesture selection types;
    executing an action corresponding to the received gesture selection type;
    updating the portion of the search query based upon the query suggestion associated with the selected query suggestion entity representation; and
    prior to executing a search on the updated portion of the search query, permitting the user to edit the updated portion of the search query.

10. The method of claim 9, wherein updating the portion of the search query comprises appending at least a portion of the query suggestion associated with the selected query suggestion entity representation to the received search query portion.

11. The method of claim 9, wherein updating the portion of the search query comprises changing the portion of the search query to a second search query portion based upon the query suggestion associated with the selected query suggestion entity representation.

12. The method of claim 9, wherein at least one of the plurality of query suggestion entity representations includes additional data related to the query suggestion associated therewith.

13. The method of claim 9, wherein at least a portion of the plurality of query suggestion entity representations includes a distinguishing visual feature indicative of one or more of: a trending search query, a previous search query executed by the user, and a query category.

14. The method of claim 9,
wherein the plurality of gesture selection types comprise: a right mouse click, a left mouse click, a drag down gesture, a slide-across gesture, slide-down gesture, a tap and hold gesture, and any combination thereof, and
wherein the plurality of actions comprise: updating a search query based on the query suggestion, providing a second query suggestion related to the query suggestion, providing additional data associated with the search query, providing synonyms of the search query, and changing a first query suggestion to a second query suggestion.

15. A system for building a long search query, the system comprising:
a search engine having one or more processors and one or more computer-readable storage media; and
a data store coupled with the search engine,
wherein the search engine:
receives at least a portion of a search query from a user;
generates a plurality of query suggestion entity representations, each query suggestion entity representation comprising a respective query suggestion based on the portion of the search query, wherein each of the plurality of query suggestion entity representations is configured to initiate performance of a plurality of actions, each action of the plurality of actions having a corresponding gesture selection type of a plurality of gesture selection types, and wherein at least one query suggestion entity representation of the plurality of the query suggestion entity representations includes a representative preview of a portion of a full set of search results, the portion of the search results being associated with the at least one query suggestion entity representation;
receives a selection of one of the plurality of query suggestion entity representations via a gesture selection type of the plurality of gesture selection types;
executes an action corresponding to the received gesture selection type;
updates the portion of the search query based on the query suggestion associated with the selected query suggestion entity representation;
generates a plurality of updated query suggestion entity representations, each updated query suggestion entity representation comprising a respective updated query suggestion based on the updated portion of the search query; and
prior to executing a search on the updated portion of the search query, permits the user to edit the updated portion of the search query.

16. The system of claim 15, wherein at least a portion of the plurality of query suggestion entity representations comprises a bounded region that is distinct with respect to others of the plurality of query suggestion entity representations.

17. The system of claim 15, wherein at least a portion of the plurality of query suggestion entities comprises additional data related to the query suggestion associated therewith.

18. The system of claim 15, wherein at least a portion of the plurality of query suggestion entity representations includes a distinguishing visual feature indicative of one or more of: a trending search query, a previous search query executed by the user, and a query category.

19. The system of claim 15,
wherein the plurality of gesture selection types comprise: a right mouse click, a left mouse click, a drag down gesture, a slide-across gesture, slide-down gesture, a tap and hold gesture, and any combination thereof, and
wherein the plurality of actions comprise: updating a search query based on the query suggestion, providing a second query suggestion related to the query suggestion, providing additional data associated with the search query, providing synonyms of the search query, and changing a first query suggestion to a second query suggestion.

20. The system of claim 15, wherein at least a portion of the plurality of updated query suggestion entity representations comprises a bounded region that is distinct with respect to others of the plurality of updated query suggestion entity representations.

* * * * *